Figure 1:
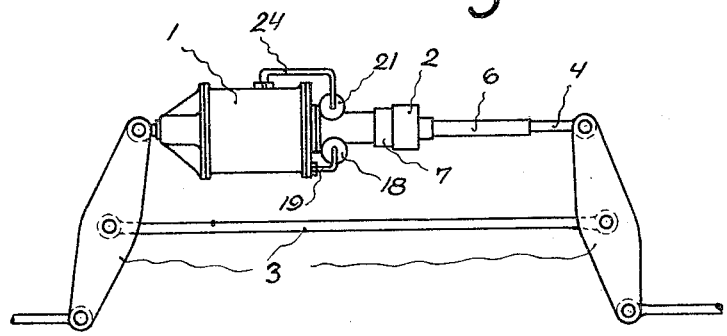

May 2, 1933.  B. H. BROWALL  1,907,175

AUTOMATIC SLACK ADJUSTER

Filed June 6, 1931

Inventor:
Bert Henry Browall
Attorney.

Patented May 2, 1933

1,907,175

UNITED STATES PATENT OFFICE

BERT HENRY BROWALL, OF MALMO, SWEDEN, ASSIGNOR TO SVENSKA AKTIEBOLAGET BROMSREGULATOR, OF MALMO, SWEDEN, A CORPORATION OF SWEDEN

AUTOMATIC SLACK ADJUSTER

Application filed June 6, 1931. Serial No. 542,645.

My present invention refers to an improvement in vehicle brakes, especially in railway car brakes, of the type in which an automatic slack adjuster of the so called double-acting type is mounted in a suitable position in the brake rigging between the source of braking power and the friction members acting upon the wheels, and wherein the said automatic slack adjuster is adapted to compensate for the variations of the slack due to wear of the said friction members or to variation of the load on the car etc., so as to keep the slack at a constant value by shortening or lengthening of that rod of the brake rigging, in which the double-acting automatic slack adjuster is mounted.

Briefly, the type of double-acting slack adjuster referred to above may be characterized in that, whilst the slack take-up means may be constructed according to any of the several constructions for similar purpose known per se, the apparatus is also provided with slack let-out means functioning substantially in the following manner: If the slack is too small, the brake rigging will be subjected to stresses before the brake piston has yet travelled its normal slack stroke. The slack adjuster is arranged so as to yield to such stresses when they have attained a certain predetermined value, the effective length of the slack adjuster in this manner being automatically adjusted so as to permit the brake piston to travel its normal length of slack stroke without increase of said stresses and without any substantial braking effect. When the brake piston arrives in its normal brake shoe application point of the stroke, a locking device is set into action preventing the further yielding of the slack adjuster and permitting the braking power to take effect. It is evident herefrom that the slack adjuster, when yielding in the manner described, will be adjusted in respect of its length with just the amount needed for restoring the amount of slack, previously too small, to its normal value, thus eliminating the necessity of manual adjustments, for instance after the replacement of worn-out brake shoes. Such double-acting automatic slack adjusters are known per se and involve no novel feature of this invention.

It has been found in practice, however, that stresses in the brake rigging may also arise due to inertia, for instance in shunting of railway cars equipped with brakes of the kind referred to, when such cars are forcibly run against each other or against buffer stops or the like, and that such stresses may cause the slack adjuster to function in an undesirable manner letting out slack when there is no need for such an action.

My present invention has for its object to eliminate this inconvenience by performing a locking of the slack adjuster when the brake is released, the locking means used for such purpose being adapted, by influence from the air pressure admitted to, or a variation of the pressure prevailing in the brake cylinder, to be set out of action when braking, so that the slack adjuster may then function in the ordinary manner.

An embodiment of the invention applied to an automatic slack adjuster adapted to be actuated by fluid pressure is diagrammatically shown in the accompanying drawing, in which:—

Figure 2:
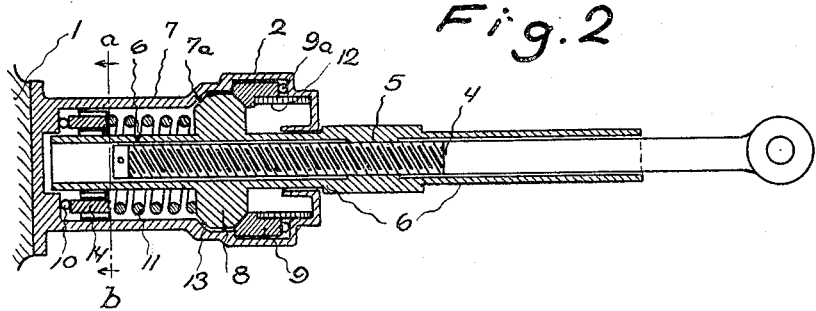
Figure 3:
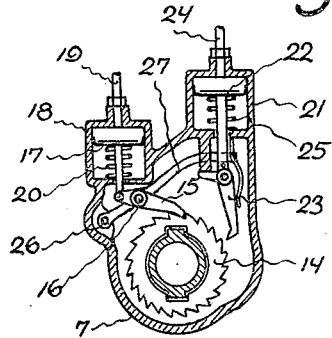

Fig. 1 shows a plan view of the fluid pressure brake equipped according to the invention, Fig. 2 is a longitudinal section of the slack adjuster proper, drawn to a larger scale than Fig. 1, and Fig. 3 is a cross section at the line a—b in Fig. 2.

Referring to the drawing, 1 is the brake cylinder and 2 is the double-acting automatic slack adjuster, which in a manner known per se is mounted in the link and lever system brake rigging having the general reference 3 and adapted in the known manner to transmit the braking movement from the source of power to the friction members adapted to coact with the wheels (not shown). The slack adjuster is adapted in a known manner, and wholly or in part due to the stresses arising in the brake rigging when braking, automatically to adjust the slack between the brake shoes and the wheels, and it may be constructed in any suitable manner independently of the invention. Similarly it may be mounted in any suitable position in, or in any suitable rod of the brake rigging, and the invention is also adaptable independently of the type of rigging employed.—Hence, it will be understood that the invention is not limited to any specific type or construction of the slack adjuster, nor to any specific type or construction of the brake rigging.

In the embodiment of the slack adjuster shown in the drawing, the adjuster is of a type comprising a screw spindle 4 having so great a pitch that it is not self-locking, such spindle being adapted to coact with a corresponding interior screw thread 5 within a nut sleeve 6 mounted slidably and rotatably within a housing 7. In the embodiment shown, this housing at its bottom end is affixed to the end of the brake cylinder 1, a lever forming part of the power transmission rigging 3 being hinged to the outer end of the screw spindle 4.

A flange 8 on the nut sleeve 6 interiorly within the housing 7, and a ring 9 rotatably mounted within said housing form two clutch members adapted for coaction with each other. By means of a spring 11 the clutch flange 8 on the nut sleeve is forced towards the clutch ring 9, and thereby there is a certain amount of axial play between the opposite side of said flange 8 and a corresponding supporting face 7ª within the housing 7. The clutch ring 9 is supported against the housing by means of an antifriction bearing 9ª in order to reduce the frictional resistance to the rotation of the same in one direction, when a reduction of too large slack is to be effected. The opposite end of the spring 11 is supported against the bottom of the housing 7 by the intermediary of an antifriction bearing 10, and between this antifriction bearing and the end of the spring is interposed a ratchet member 14, splined to the nut sleeve 6. The ratchet member 14 and the nut sleeve 6 are thus rotatively connected, but the sleeve 6 is free to be axially displaced over the distance of play between the flange 8 and the supporting face 7ª in case the power of the spring 11 is overcome. The clutch ring 9 is rotatable within said housing in one direction only, the rotation of the same in the opposite direction being prevented by means of a locking means having the general reference 12 although not nearer shown or disclosed. This unidirectional locking means may be constructed in many different ways, as will easily be understood by those skilled in the art, and in the embodiment shown it is supposed to consist of an expandable torsional spring having a rectangular cross sectional shape and working as a friction clutch of the type shown and described in U. S. Patent No. 1,006,500 (granted on an application filed by Erick B. Peterson) to rotatably connect the housing 7 and the ring 9 when either one of these members is rotated in a direction to unwind the spring.

According to the drawing, the slack adjuster is supposed to be of the pneumatic type, and its actuating means consists of a cylinder 21 provided with a slidable piston 22 acted upon in one direction by a spring 25 and supporting a pawl 23 adapted to coact with the ratchet member or wheel 14 referred to above. By means of a pipe 24 the cylinder 21 is connected with the brake cylinder 1 at a suitably chosen point of its length, and preferably at a point corresponding substantially to the normal slack stroke. When the brake piston passes beyond this point of connection of the pipe 24 when braking, the pressure within the brake cylinder is transmitted to the cylinder 21 and acts upon the piston 22 therein, which is pressed inwardly and compresses the spring 25, so that the pawl 23 is brought into engagement with the ratchet wheel 14. If the slack is too large, the brake shoes have not come into contact with the wheels, and then the piston 22 will move further inwardly and cause a rotation of the nut sleeve 6 by the intermediary of the pawl and ratchet mechanism 23, 13 for a reduction of the slack.

The rotation of the nut sleeve 6 in relation to the housing 7 in a direction for increase of the slack is prevented by the coacting clutch members 8 and 9 and the unidirectional locking device 12 until the stresses arising in the brake rigging 3 when braking have reached a value sufficient to overcome the spring 11. When this spring is compressed due to said stresses, so that the clutch flange 8 goes out of engagement with the clutch ring 9 and permits a rotation of the nut sleeve 6 in relation to the housing 7 and to the screw spindle 4, the not self-locking thread on the latter will cause a rotation of the members 6, 8 and 14, unless the pawl member 23, or another pawl member 15 to be described in the following, are in engagement with the corresponding ratchet member, or until said pawl members are engaged and prevent such a rotation. In case the rotation is prevented, the spring 11 is further compressed until the flange 8 comes into contact with the supporting face 7ª which thereafter will serve as a support for the braking stress developed. If the piston 22 comes into action prior to the arising of braking stresses in the rigging, the members 18, 8 and 6 will be turned in the opposite direction so that the slack is reduced. The clutch ring 9 will then easily be rotated due to the antifriction bearing 9ª, and the unidirectional locking means 12 does not prevent the rotation in this direction.

At the arising of the braking stress, the members are already locked against rotation, and then the braking power will develop in the manner described above. It will easily be understood by those skilled in the art that the pneumatic actuation means described in the foregoing may be substituted by other, for instance mechanical, means acting in the same manner and known long ago for the purpose.

As hinted at above, unintentional stresses may arise in the brake rigging when the brake is in released position, such as by shunting of the cars, and these stresses may cause an action of the slack adjuster so that the latter performs an undesired let-out of slack. For eliminating this inconvenience the slack adjuster according to the invention is provided with a locking means adapted normally to prevent any let-out movement of the slack adjuster, such locking means being releasable under influence from the pressure admitted to, or a variation of the pressure prevailing in the brake cylinder when braking. This locking means and the mechanism adapted for release of the same may be constructed in many different ways, and all of them are within the scope of the present invention.

In the embodiment shown in the drawing the said locking means is supposed to coact with the ratchet wheel 14 referred to above, and it consists of the pawl member 15 also hinted at. The pawl 15 is mounted on a pin 16 and connected with a spring-pressed piston 17 slidably mounted in a small cylinder 18 which is connected with the brake cylinder 1 by means of a pipe 19.

Normally the pawl 15 is in engagement with the ratchet wheel 14 and prevents a rotation of the nut sleeve 6 so that the slack adjuster is locked and no adjustment of the slack can be performed in the direction of a let-out. When the pressure is admitted to the brake cylinder for the purpose of braking, this pressure is at once transmitted to the small cylinder 18 in which the piston is pressed inwardly in counteraction of the spring 20, so that the pawl 15 is tilted out of engagement with the ratchet wheel 14, and then the locking means is released.

In order that the pawl 15 shall be able to assist the pawl 23 in preventing an unintentional return rotation of the sleeve 6 when the brake cylinder pressure, when braking, has been transmitted to the cylinder 21, the pawl 15 by means of its pivot pin 16 is mounted on a lever 27 pivotally mounted on a pin 26 in the housing 7, the said lever at its free end being connected with the piston 22 or its piston rod, so as to be tilted at the movement of said position. Therefore, when the piston 22 is pressed downwardly in opposition to the spring 25, the lever 27 is tilted so that the pawl 15 supported by the same is brought into engagement with the ratchet wheel 14 in spite of the fact that the piston 17 also connected with the said pawl is then kept pressed down in opposition to its return spring 20.

If desired, the slack adjuster may be constructed in any known or suitable manner so as to be adapted both for reduction of too large a slack and for increase of a slack that has become too small from one reason or another. In the embodiment shown, the screw spindle 4 forming part of the slack adjuster is supposed to take such a position in the brake rigging that it is subjected to pressure when braking, but it is evident to anyone skilled in the art that the slack adjuster might also be positioned otherwise in the rigging, and in a position in which the said spindle will be subjected to tension. In both instances the locking means forming the subject matter of this invention will act substantially in the same manner.

Further, the slack adjuster need not be rigidly connected with the brake cylinder, as shown in the drawing, but it may also be positioned at a distance therefrom substantially anywhere in the brake rigging, and then the pipes 19 and 24 connecting the same with the brake cylinder may consist of flexible tubes or hoses of suitable construction.

What I claim and desire to secure by Letters Patent is:

1. In an automatic slack adjuster for brake systems, two coacting adjusting members, an actuating means adapted to coact with one of said adjusting members for performing the adjustment, means for performing an operation of said actuating means at a predetermined length of movement of the brake power applying means when braking, locking means adapted when the brake is released to lock the adjusting member acted upon by the actuating means, and means for disengagement of said locking means when starting a braking operation.

2. In an automatic slack adjuster according to claim 1, the additional feature of means for reengagement of the locking means after a predetermined length of movement of the brake power applying means.

3. In an automatic slack adjuster for brake systems, a screw spindle forming part of the brake rigging, a nut member surrounding said spindle and connected with another part of the brake rigging, actuating means adapted for performing a relative rotation between the spindle and nut member for performing the adjustment, means for performing an operation of said actuating means at a predetermined length of movement of the brake power applying means when braking, locking means adapted when the brake is released to prevent the said relative rotation at least in one direction, and means for disengagement of said locking means when starting a braking operation.

4. In an automatic slack adjuster according to claim 3, the additional feature of means for re-engagement of the locking means after a predetermined length of movement of the brake power applying means.

5. In an automatic slack adjuster for brake systems, a screw spindle forming a non-rotatable member of the brake rigging, a nut member positioned in engagement with said screw spindle and adapted for coaction therewith, actuating means adapted for rotation of said nut member on the screw spindle for the purpose of adjustment, means for performing an operation of said actuating means at a predetermined length of movement of the brake power applying means when braking, locking means adapted when the brake is released to prevent the rotation of the nut member at least in one direction, and means for disengagement of said locking means when starting a braking operation.

6. In an automatic slack adjuster according to claim 5, the additional feature of means for reengagement of the locking means after a predetermined length of movement of the brake power applying means.

7. In an automatic slack adjuster for fluid pressure brake systems, two coacting adjusting members, actuating means adapted to coact with one of said adjusting members for performing the adjustment, means for performing an operation of said actuating means at a predetermined length of stroke of the brake piston when braking, fluid pressure operated locking means adapted when the brake is released to lock the adjusting member acted upon by the actuating means, and means for disengagement of the said locking means when starting a braking operation.

8. In an automatic slack adjuster according to claim 7, the additional feature of fluid pressure operated means for re-engagement of the locking means after a predetermined length of stroke of the brake piston.

9. In an automatic slack adjuster for fluid pressure brake systems, a screw spindle forming a member of the brake rigging, a nut member surrounding said spindle and connected with another brake rigging member longitudinally displaceable in relation to the former, actuating means adapted for performing a relative rotation between the spindle and nut members for performing the adjustment, means for performing an operation of said actuating means at a predetermined length of stroke of the brake piston when braking, fluid pressure operated locking means adapted when the brake is released to prevent the said relative rotation at least in one direction, and means for disengagement of said locking means when starting a braking operation.

10. In an automatic slack adjuster according to claim 9, the additional feature of fluid pressure operated means for re-engagement of the locking means after a predetermined length of stroke of the brake piston.

11. In an automatic slack adjuster for fluid pressure brake systems, a screw spindle forming a non-rotatable member of the brake rigging, a nut member positioned with said screw spindle and engagement adapted for coaction therewith, actuating means adapted for rotation of said nut member on the screw spindle for the purpose of adjustment, means for performing an operation of said actuating means at a predetermined length of stroke of the brake piston when braking, fluid pressure operated locking means adapted when the brake is released to prevent the rotation of the nut member at least in one direction, and means for disengagement of said locking means when starting a braking operation.

12. In an automatic slack adjuster according to claim 11, the additional feature of fluid pressure operated means for re-engagement of the locking means after a predetermined length of stroke of the brake piston.

13. In an automatic slack adjuster for fluid pressure brake systems, a screw spindle forming a member of the brake rigging, a nut member surrounding said spindle and connected with another brake rigging member longitudinally displaceable in relation to the former, actuating means adapted for performing a relative rotation between the spindle and nut members for performing the adjustment, means for performing an operation of said actuating means at a predetermined length of stroke of the brake piston when braking, a toothed locking wheel connected with the adjusting member adapted to be actuated by the actuating means, a pawl adapted for coaction with said locking wheel for the purpose of locking the same, means for keeping the pawl in engagement with the toothed wheel when the brake is released, a fluid pressure operated means for disengagement of said pawl when starting a braking operation.

14. In an automatic slack adjuster according to claim 13, the additional feature of fluid pressure operated means for re-engagement of the pawl with the toothed locking wheel after a predetermined length of stroke of the brake piston.

15. In an automatic slack adjuster for fluid pressure brake systems, a screw spindle forming a non-rotatable member of the brake rigging, a nut member positioned in engagement with said screw spindle and adapted for coaction therewith, actuating means adapted for rotation of said nut member on the screw spindle for the purpose of adjustment, means for performing an operation of said actuating means at a predetermined length of stroke of the brake piston when braking, a toothed locking wheel connected with said nut member, a pawl adapted for coaction with said toothed wheel for the purpose of locking the nut member connected with the same, means for keeping the pawl in engagement with the toothed wheel when the brake is released, and fluid pressure operated means for disengagement of said pawl when starting a braking operation.

16. In an automatic slack adjuster according to claim 15, the additional feature of fluid pressure operated means for re-engagement of the pawl with the toothed locking wheel after a predetermined length of stroke of the brake piston.

17. In an automatic slack adjuster for fluid pressure brake systems, a screw spindle forming a non-rotatable member of the brake rigging, a nut member positioned in engagement with said screw spindle and adapted for coaction therewith, actuating means adapted for rotation of said nut member on the screw spindle for the purpose of adjustment, means for performing an operation of said actuating means at a predetermined length of stroke of the brake piston when braking, a ratchet wheel connected with the nut member, a pawl adapted for coaction with said ratchet wheel, a lever pivotally mounted at its one end supporting said pawl intermediate its ends, the free end of said lever being adapted to be acted upon by the actuating means for engagement of the pawl, means for keeping the pawl in engagement when the brake is released, and fluid pressure operated means for disengagement of the pawl when starting a braking operation.

In testimony whereof I have signed my name to this specification.

BERT HENRY BROWALL.